US009208569B2

(12) United States Patent
Yokoyama (10) Patent No.: US 9,208,569 B2
(45) Date of Patent: Dec. 8, 2015

(54) IMAGE PROCESSING APPARATUS AND CONTROL METHOD THEREOF CAPABLE OF PERFORMING REFOCUS CALCULATION PROCESSING FOR LIGHT FIELD DATA (71) Applicant: CANON KABUSHIKI KAISHA, Tokyo (JP)

(72) Inventor: Masanao Yokoyama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/163,189

(22) Filed: Jan. 24, 2014

(65) Prior Publication Data
US 2014/0219576 A1 Aug. 7, 2014

(30) Foreign Application Priority Data

Feb. 1, 2013 (JP) ................................. 2013-018964

(51) Int. Cl.
G06K 9/40 (2006.01)
G06T 7/00 (2006.01)
G06T 5/00 (2006.01)
H04N 5/232 (2006.01)

(52) U.S. Cl.
CPC .............. G06T 7/0051 (2013.01); G06T 5/003 (2013.01); H04N 5/23212 (2013.01); H04N 5/23229 (2013.01)

(58) Field of Classification Search
CPC .. G06T 7/0051; G06T 5/001; H04N 5/23212; H04N 5/23248; H04N 5/23254; H04N 5/23258
See application file for complete search history.

(56) References Cited

U.S. PATENT DOCUMENTS

| 4,851,657 | A  | * | 7/1989 | Taniguchi et al. | ......... 250/201.7 |
| 4,860,045 | A  | * | 8/1989 | Hamada et al. | ................. 396/95 |
| 2004/0066492 | A1 | * | 4/2004 | Nakashima et al. | ............ 353/20 |
| 2010/0141802 | A1 | * | 6/2010 | Knight et al. | .............. 348/240.3 |
| 2013/0308035 | A1 | * | 11/2013 | Hiasa et al. | ................... 348/340 |

(Continued)

FOREIGN PATENT DOCUMENTS

JP 2011-022796 A 2/2011

OTHER PUBLICATIONS

Ren Ng, and seven others, Light Field Photography with a Hand-held Plenoptic Camera, Stanford Tech Report CTSR Feb. 2005.

(Continued)

Primary Examiner — Amir Alavi
(74) Attorney, Agent, or Firm — Cowan, Liebowitz & Latman, P.C.

(57) ABSTRACT

An image processing apparatus comprises a captured image data acquisition unit configured to acquire captured image data, an information acquisition unit configured to acquire information of object distances of objects, a refocus image generation unit configured to generate a refocus image at a predetermined focus position in the captured image data, a display unit configured to display the refocus image on a display medium, a designation unit configured to designate an address in the refocus image displayed by the display unit, and a distance calculation unit configured to calculate distances between the designated address and positions of the objects in the refocus image, wherein the refocus image generation unit generates a refocus image using, as a focus position, an object distance of one of the objects based on the distances.

16 Claims, 10 Drawing Sheets

(56) References Cited

U.S. PATENT DOCUMENTS

2014/0219576 A1* 8/2014 Yokoyama ................... 382/255
2014/0240578 A1* 8/2014 Fishman et al. ......... 348/333.08

OTHER PUBLICATIONS

Ren Ng, Fourier Slice Photography, Stanford University, 2005, ACM Trans. Graph 24, 735-744.

* cited by examiner

IMAGE PROCESSING APPARATUS AND CONTROL METHOD THEREOF CAPABLE OF PERFORMING REFOCUS CALCULATION PROCESSING FOR LIGHT FIELD DATA

BACKGROUND OF THE INVENTION

1. Field of the Invention

The present invention relates to an image processing apparatus which performs refocus calculation processing for light field data.

2. Description of the Related Art

Recently, an image capturing apparatus having the following arrangement is proposed in, for example, "Ren. Ng and seven others, 'Light Field Photography with a Hand-Held Plenoptic Camera', Stanford Tech Report CTSR 2005-02". In this image capturing apparatus, each microlens array is arranged in front of a solid-state image sensor for a plurality of pixels to obtain even information in the incident direction of a light beam entering the image sensor. As application purposes of this image capturing apparatus, the following application is conceivable, in addition to generating a normal shot image based on an output signal from each pixel. More specifically, the image capturing apparatus can reconstruct an image by refocus calculation processing using a coefficient (to be referred to as a refocus coefficient hereinafter) which adjusts the focus to a desired focus position in a shot image.

When viewing a refocusable image, the image blurs at a portion which is out of focus, and it is difficult to search for an object the user wants. To solve this problem, Japanese Patent Laid-Open No. 2011-22796 discloses a technique of extracting an object from an image and displaying a refocus image in which the object is in focus.

However, in the conventional technique disclosed in Japanese Patent Laid-Open No. 2011-22796, it is necessary to hold information in shooting as tag data, and calculate a phase difference between a plurality of images corresponding to different viewpoints in order to determine a refocus plane after reconstruction. As a result, the calculation amount becomes large.

SUMMARY OF THE INVENTION

The present invention has been made to solve the above-described problems, and accurately, easily enable refocus calculation processing to an object position the user wants in an image capturing apparatus capable of reconstructing an image by refocus calculation processing.

According to the first aspect of the present invention, there is provided an image processing apparatus comprising: a captured image data acquisition unit configured to acquire captured image data capable of generating a refocus image in which a focus position is changed; an information acquisition unit configured to acquire information of object distances of objects; a refocus image generation unit configured to generate a refocus image at a predetermined focus position in the captured image data; a display unit configured to display the refocus image on a display medium; a designation unit configured to designate an address in the refocus image displayed by the display unit; and a distance calculation unit configured to calculate distances between the designated address and positions of the objects in the refocus image, wherein the refocus image generation unit generates a refocus image using, as a focus position, an object distance of one of the objects based on the distances calculated by the distance calculation unit.

According to the second aspect of the present invention, there is provided a method of controlling an image processing apparatus, comprising: a captured image data acquisition step of acquiring captured image data capable of generating a refocus image in which a focus position is changed; an information acquisition step of acquiring information of object distances of objects; a refocus image generation step of generating a refocus image at a predetermined focus position in the captured image data; a display step of displaying the refocus image on a display medium; a designation step of designating an address in the refocus image displayed in the display step; and a distance calculation step of calculating distances between the designated address and positions of the objects in the refocus image, wherein in the refocus image generation step, a refocus image using, as a focus position, an object distance of one of the objects based on the distances calculated in the distance calculation step is generated.

Further features of the present invention will become apparent from the following description of exemplary embodiments with reference to the attached drawings.

DESCRIPTION OF THE EMBODIMENTS

First Embodiment

Figure 1:
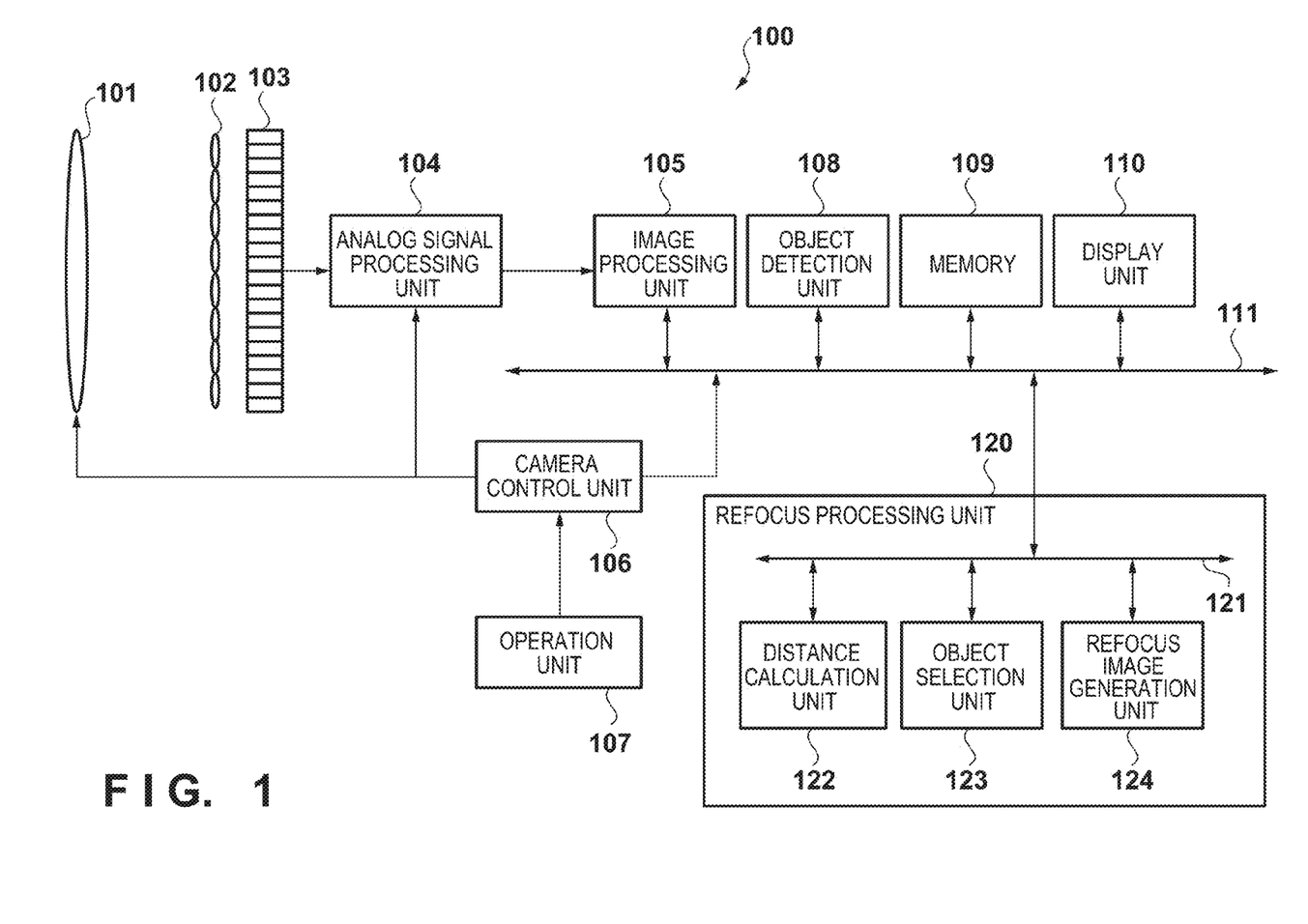
FIG. 1 is a block diagram showing the arrangement of an image capturing apparatus common to respective embodiments of the present invention.

FIG. 1 is a block diagram showing the arrangement of an image capturing apparatus in the first embodiment.

An image capturing apparatus 100 includes an imaging lens 101, microlens array 102 (to be referred to as MLA hereinafter), image sensor 103, analog signal processing unit 104, image processing unit 105, camera control unit 106, and operation unit 107. The image capturing apparatus 100 also includes an object detection unit 108, memory 109, display unit 110, refocus processing unit 120, and system bus 111. The image processing unit 105, camera control unit 106, object detection unit 108, memory 109, display unit 110, and refocus processing unit 120 are connected via the system bus 111. The imaging lens 101, analog signal processing unit 104, and operation unit 107 are connected to the camera control unit 106. The refocus processing unit 120 includes a distance calculation unit 122, object selection unit 123, and refocus image generation unit 124, and is connected to the system bus 111 via a local bus 121.

Although not shown, the imaging lens 101 is constructed by a plurality of lenses. These lenses include a movable focusing lens. The focus on an object can be adjusted by moving the focusing lens in accordance with an instruction from the camera control unit 106.

The MLA 102 is constructed by a plurality of microlenses and arranged near the focus position of the imaging lens 101. Light beams having passed through different pupil areas (partial areas of the pupil) of the imaging lens 101 enter the MLA 102, are split for the respective pupil areas, and emerge.

The image sensor 103 is an image sensor, such as a CCD or CMOS sensor, and includes many pixel arrays for photoelectrically converting object image light having passed through the imaging lens 101 and MLA 102 into an analog image signal. Note that an arrangement in which cameras having different viewpoints are regarded as a single image sensor 103, as in Japanese Patent Laid-Open No. 2011-22796, is effective for even the present invention as an imaging optical system for obtaining light field data. The imaging optical system is not limited to the above-described one as long as light field data, which is generally three-dimensional information of an object space, can be acquired.

In accordance with an instruction from the camera control unit 106, the analog signal processing unit 104 performs signal processes such as CDS (Correlated Double Sampling), gain adjustment, and A/D conversion for the analog image signal output from the image sensor 103. The analog signal processing unit 104 transfers a digital image signal having undergone signal processing to the image processing unit 105.

In accordance with an instruction from the camera control unit 106, the image processing unit 105 performs image processes such as white balance adjustment, interpolation, edge enhancement, γ correction, and tone conversion for the digital image signal processed by the analog signal processing unit 104. The image processing unit 105 stores the digital image signal having undergone signal processing in the memory 109.

The memory 109 temporarily stores the digital image signal output from the image processing unit 105. The memory 109 temporarily stores setting information created in the course of processing by the camera control unit 106.

The operation unit 107 is a portion configured to accept an operation from the user, including a button, touch panel, and the like. In accordance with an accepted operation, various operations are performed, including the start of a focusing operation and playback/erase of digital image data saved in the memory 109.

The camera control unit 106 receives an instruction from the operation unit 107 and exclusively controls the operations of the respective blocks in order to execute shooting. The display unit 110 is constructed by an LCD (Liquid Crystal Display) or the like. The display unit 110 receives and displays a digital image signal processed by a refocus processing unit 210.

The object detection unit 108 detects the faces of all objects from digital image data obtained by the image processing unit 105, and detects face positions in the frame. Although face detection will be explained here, object detection processing such as human body detection may be performed. As for object detection, assume that well-known face detection processing or human body detection processing is performed.

The distance calculation unit 122 calculates a distance between a position designated by the user via the operation unit 107 and an object position obtained by the object detection unit 108, and stores the calculation result in the memory 109. When a plurality of objects are detected, the distance calculation unit 122 calculates distances by the number of detected objects, and stores the calculation results in the memory 109.

The object selection unit 123 reads out the results of the distance calculation unit 122 from the memory 109, selects an object closest to the position designated by the user, and transfers information of the selected object position to the refocus image generation unit 124.

The refocus image generation unit 124 performs refocus calculation processing by using the refocus coefficient of the object selected by the object selection unit 123, generating refocus image data. As for the refocus calculation processing, for example, a method "Fourier Slice Photography" (see Ren Ng., 2005, ACM Trans. Graph. 24, 735-744) is used.

Next, the arrangement of the imaging lens 101, microlens array 102, and image sensor 103 in the image capturing apparatus according to the embodiment will be explained.

Figure 2:
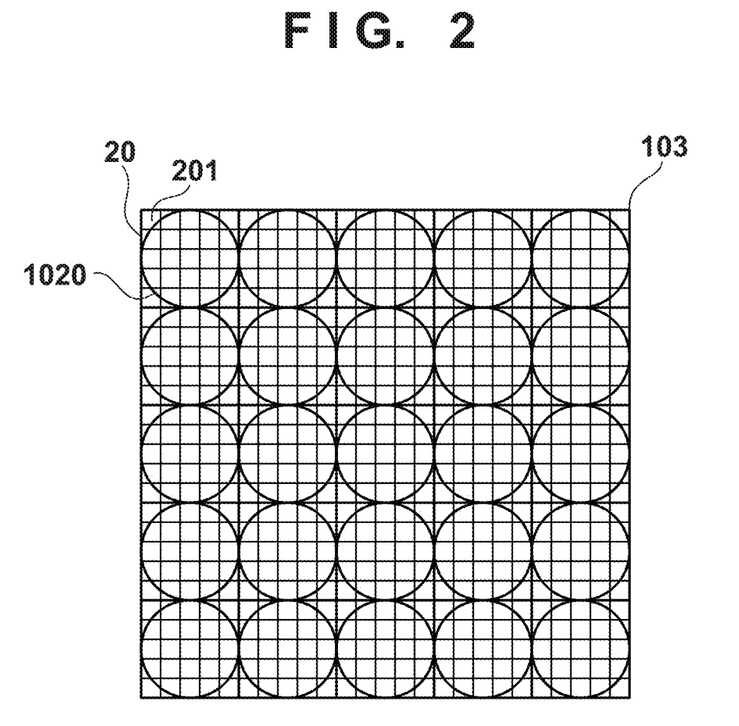
FIG. 2 is a view for explaining the arrangement of an image sensor and microlens array.

FIG. 2 is a view showing the image sensor 103 and microlens array 102 when observed from the optical axis Z in FIG. 1. One microlens 1020 is arranged to correspond to a plurality of unit pixels 201.

The plurality of unit pixels 201 behind one microlens will be defined to form as a pixel array 20. The embodiment assumes that the pixel array 20 includes 5×5=25 unit pixels 201 in total, and the image sensor 103 includes 5×5=25 pixel arrays 20.

Figure 3:
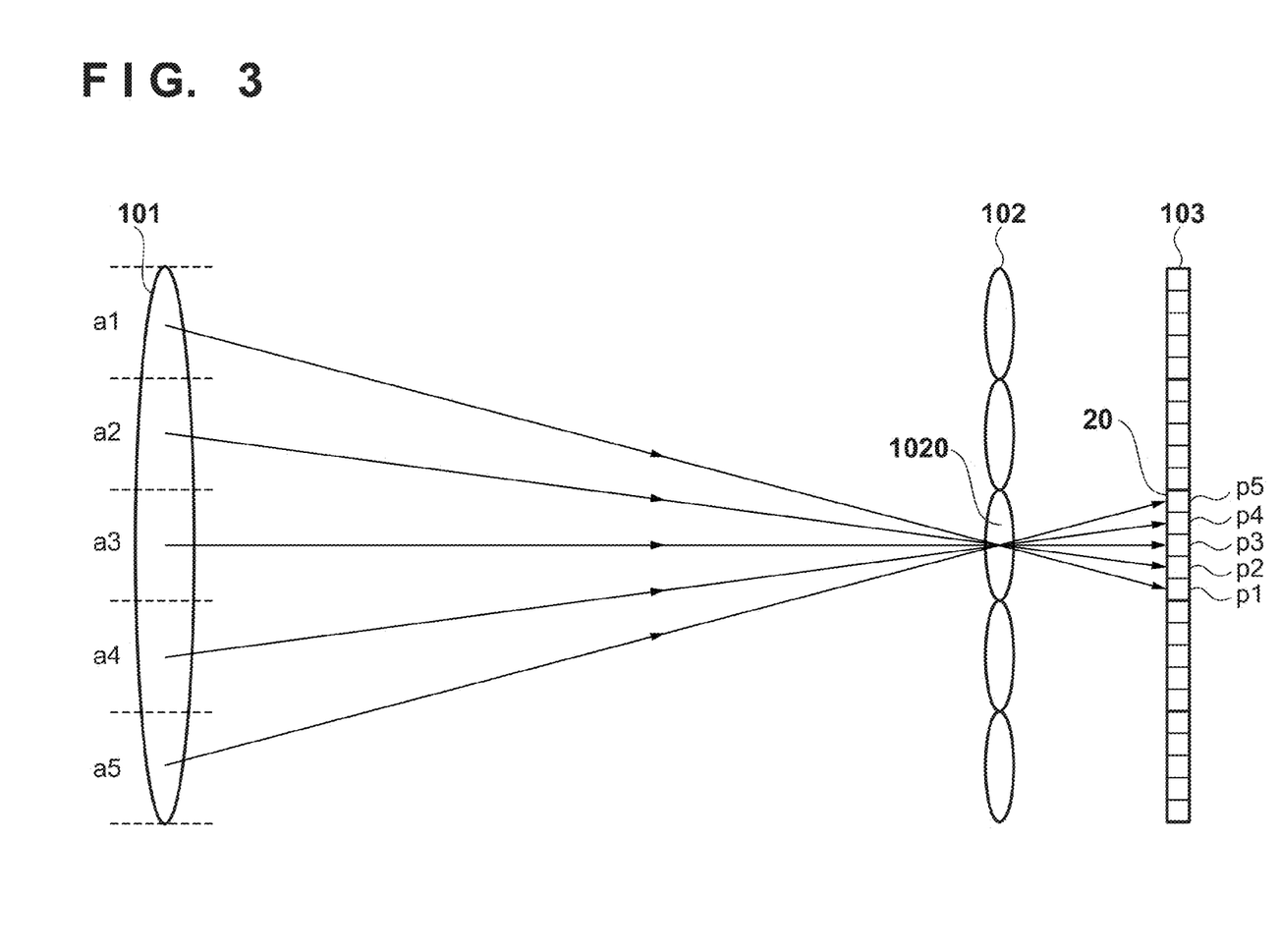
FIG. 3 is a view for explaining the arrangement of an imaging lens, microlens array, and image sensor.

FIG. 3 is a view showing a state in which light emerging from the imaging lens 101 passes through one microlens 1020 and is received by the image sensor 103, when observed from a direction perpendicular to the optical axis Z. Beams which emerge from pupil areas a1 to a5 of the imaging lens 101 and pass through the microlens 1020 form images in corresponding unit pixels p1 to p5 behind.

Figure 4A:
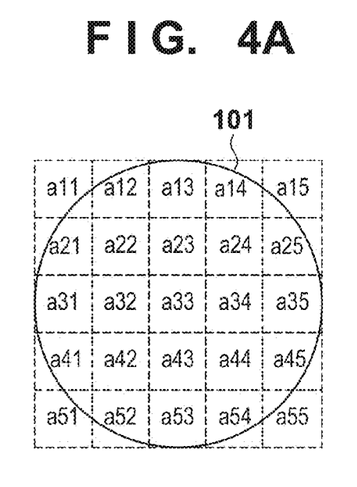
FIGS. 4A and 4B are views for explaining the correspondence between pupil areas of the imaging lens and light receiving pixels.
Figure 4B:
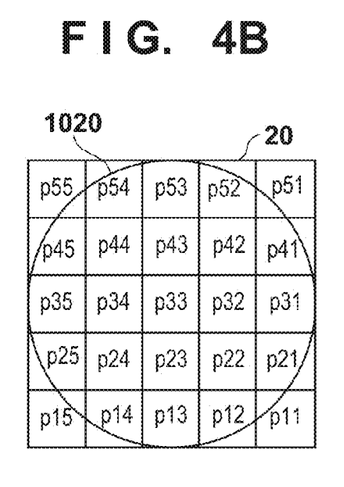

FIG. 4A is a view showing the opening of the imaging lens 101 when viewed from the optical axis Z. FIG. 4B is a view showing one microlens 1020 and the pixel array 20 arranged behind it when viewed from the optical axis Z. When the pupil area of the imaging lens 101 is divided into areas equal in number to pixels behind one microlens, as shown in FIG. 4A, light emerging from one pupil division area of the imaging lens 101 forms an image in one pixel. Assume that the imaging lens 101 and microlens 1020 have almost the same f-number.

The correspondence between pupil division areas a11 to a55 of the imaging lens 101 shown in FIG. 4A and pixels p11 to p55 shown in FIG. 4B is point-symmetrical when viewed from the optical axis Z. Hence, light emerging from the pupil division area a11 of the imaging lens 101 forms an image in the pixel p11 in the pixel array 20 behind the microlens. Similarly, light which emerges from the pupil division area a11 and passes through another microlens 1020 also forms an image in the pixel p11 in the pixel array 20 behind this microlens.

A method of calculating a focus position (refocus plane) corresponding to an arbitrary object position in the frame (in the image) will be explained.

As described with reference to FIGS. 4A and 4B, the respective pixels of the pixel array 20 receive beams having passed through different pupil areas of the imaging lens 101. By combining a plurality of pixel signals from these division signals, a pair of signals pupil-divided in the horizontal direction is generated:

$$\sum_{a=1}^{5}\sum_{b=1}^{2}(p_{ab}) \quad (1)$$

$$\sum_{a=1}^{5}\sum_{b=4}^{5}(p_{ab}) \quad (2)$$

Expression (1) integrates beams having passed through the left area (pupil areas a11 to a51 and a12 to a52) of the exit pupil of the imaging lens 101 for the respective pixels of a given pixel array 20. This is applied to a plurality of pixel arrays 20 aligned in the horizontal direction, and an object image constructed by these output signals is defined as an A image. Expression (2) integrates beams having passed through the right area (pupil areas a14 to a54 and a15 to a55) of the exit pupil of the imaging lens 101 for the respective pixels of the given pixel array 20. This is applied to a plurality of pixel arrays 20 aligned in the horizontal direction, and an object image constructed by these output signals is defined as a B image. The correlation between the A and B images is calculated to detect an image shift amount (pupil division phase difference). Further, the image shift amount is multiplied by a conversion coefficient determined from the focus position of the imaging lens 101 and the optical system. As a result, a focus position corresponding to an arbitrary object position in the frame can be calculated.

Next, processing of reconstructing an image (processing of enabling refocus) at an arbitrarily set focus position (refocus plane) from captured image data (image data) acquired by the arrangement of the imaging lens 101, microlens array 102, and image sensor 103 will be explained.

Figure 5:
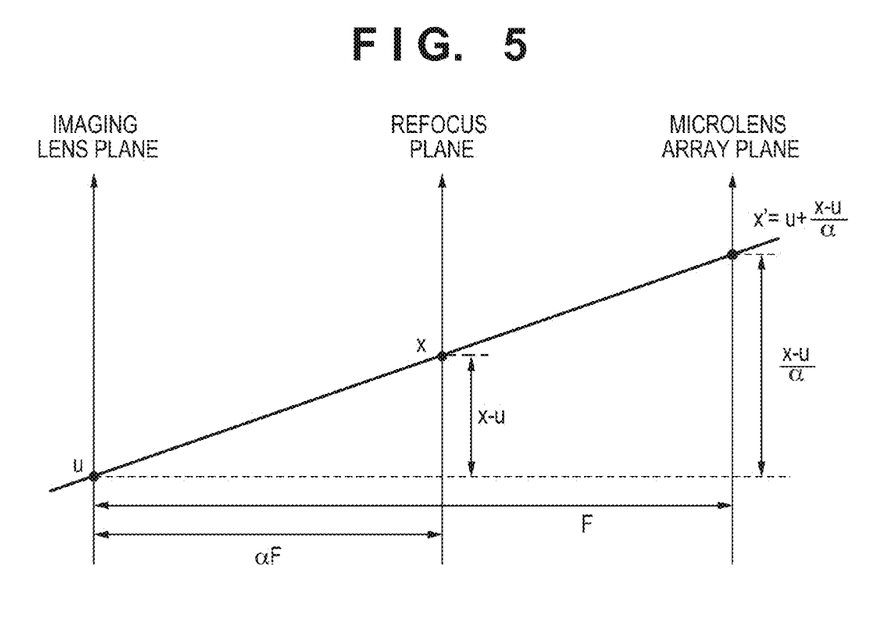
FIG. 5 is a graph for explaining an area through which a refocus image generation beam passes.

FIG. 5 is a graph showing a pupil division area of the imaging lens from which light passing through a given pixel on an arbitrarily set refocus plane emerges, and a microlens the light enters, when viewed from a direction perpendicular to the optical axis Z. In FIG. 5, the position of a pupil division area of the imaging lens is indicated by coordinates (u, v), a pixel position on the refocus plane is indicated by coordinates (x, y), and the position of a microlens on the microlens array is indicated by coordinates (x', y'). Also, the distance from the imaging lens to the microlens array is indicated by F, and the distance from the imaging lens to the refocus plane is indicated by αF. α is a refocus coefficient for determining the position of the refocus plane and can be arbitrarily set by the user. FIG. 5 shows only the u, x, and x' directions and does not show any of the v, y, and y' directions. As shown in FIG. 5, light having passed through the coordinates (u, v) and coordinates (x, y) reaches the coordinates (x', y') on the microlens array. The coordinates (x', y') are given by:

$$(x', y') = \left(u + \frac{x-u}{a}, v + \frac{y-v}{a}\right) \quad (3)$$

Letting L(x', y', u, v) be an output from the pixel which receives this light, an output E(x, y) obtained at the coordinates (x, y) on the refocus plane is an integral of L(x', y', u, v) in regard to the pupil area of the imaging lens and is given by:

$$E(x, y) = \frac{1}{a^2 F^2} \int\int L\left(u + \frac{x-u}{a}, v + \frac{y-v}{a}, u, v\right) du\, dv \quad (4)$$

In equation (4), the refocus coefficient α is determined by the user. Thus, if (x, y) and (u, v) are given, the position (x', y') of a microlens which receives light can be obtained. Then, a pixel corresponding to the position (u, v) is obtained from a pixel array 20 corresponding to this microlens. An output from this pixel is L(x', y', u, v). This is executed for all pupil division areas, obtained pixel outputs are integrated, and thus E(x, y) can be calculated. If (u, v) are defined as the representative coordinates of a pupil division area of the imaging lens, the integration of equation (4) can be calculated by simple addition.

The sequence of an operation of estimating an object and automatically adjusting the focus position according to the first embodiment of the present invention will be described below with reference to FIG. 6.

First, in step S201, the user inputs a shooting instruction via the operation unit 107. The imaging lens 101 converges a light beam to form an object image on the light receiving surface of the image sensor 103 via the MLA 102, acquiring light field data (acquisition of light field data). Then, in step S202, the light field data is A/D-converted by the analog signal processing unit 104 and undergoes development processing and the like by the image processing unit 105. The generated digital image data is stored in the memory 109. FIG. 7A shows an image obtained by performing development processing in step S202 for a shot image of objects SUB1, SUB2, and SUB3.

In step S203, the object detection unit 108 reads out the digital image data stored in the memory 109, detects the faces of all objects, and stores face positions at this angle of view in the memory 109 (acquisition of position information). In FIG. 7B, the face position indicates the center position of a detected face frame. Reference numeral 301 denotes a face position of the object SUB1; 302, a face position of the object SUB2; and 303, a face position of the object SUB3.

After that, in step S204, the refocus image generation unit 124 reads out the digital image data stored in the memory 109, generates a refocus image by using a refocus coefficient at an initially set focus position, and outputs the refocus image to the display unit 110. The initially set focus position may be a specific focus position, or a focus position where refocus processing was performed before. FIG. 7C shows a display image in which the initially set focus position is the object SUB1 in the shot image of the objects SUB1, SUB2, and SUB3.

In step S204, the object SUB1 is in refocus and the images of the objects SUB2 and SUB3 have blurred. If it is determined in step S205 that the user has input a focus position change instruction via the operation unit 107, the process shifts to step S206; if he has not input the instruction, the process returns to step S205.

In step S206, the distance calculation unit 122 calculates distances between the focus position designated in step S205 and all the object positions detected in step S203, and stores the calculation results in the memory 109. In FIG. 7D, reference numeral 304 denotes a focus position to which the user has input the change instruction (position designation). D1 is the distance between the face position of the object SUB1 and the focus position 304, D2 is the distance between the face position of the object SUB2 and the focus position 304, and D3 is the distance between the face position of the object SUB3 and the focus position 304.

In step S207, the object selection unit 123 selects an object having a shortest distance (object corresponding to a short distance) from the position designated by the user, based on the results of the distances calculated in step S206. The object selection unit 123 then transfers information of the selected object position to the refocus image generation unit 124. In FIG. 7D, D2<D1<D3, so the object SUB2 is selected and the face position 302 is transferred to the refocus image generation unit 124.

In step S208, the refocus image generation unit 124 reads out the digital image data stored in the memory 109. The refocus image generation unit 124 generates a refocus image by using a refocus coefficient at the focus position transferred from the object selection unit 123 in step S207 (generation of a corrected refocus image), and outputs it to the display unit 110. FIG. 7E shows a display image in which the selected focus position is the object SUB2 in the shot image of the objects SUB1, SUB2, and SUB3. In step S208, the object SUB2 is in refocus, and the images of the objects SUB1 and SUB3 have blurred.

With the above-described arrangement, when refocus calculation processing is performed for acquired light field data to an arbitrary focus position designated by the user, it is performed to the position of an object closest to the designated position. Hence, even for an object which is out of focus and has blurred and is hard to confirm, an object of interest can be estimated, and refocus calculation processing can be accurately, easily performed to an object position the user wants.

Second Embodiment

The sequence of an operation of determining whether an object falls in a predetermined depth of field from a current focus position, and automatically adjusting the focus position according to the second embodiment of the present invention will be described below with reference to FIG. 8.

Figure 6:
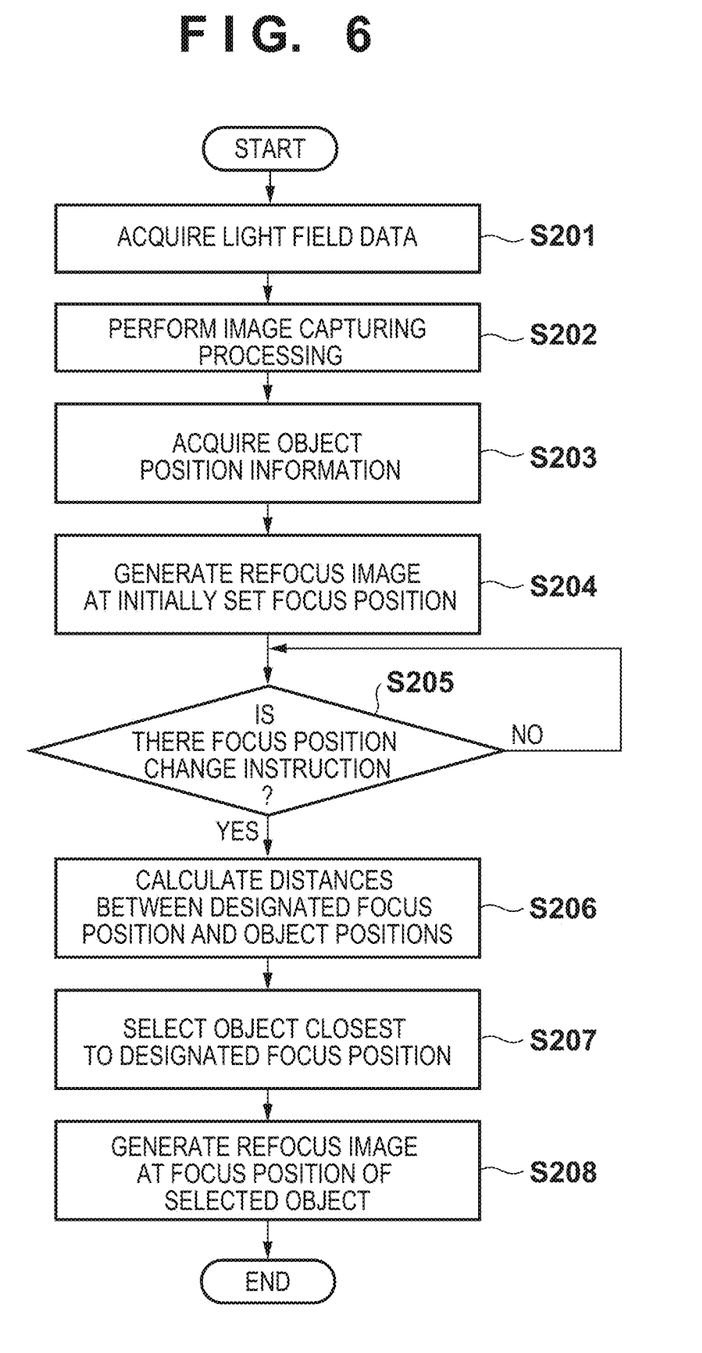
FIG. 6 is a flowchart of the first embodiment in which an object is estimated and the focus position is automatically adjusted.
Figure 7A:
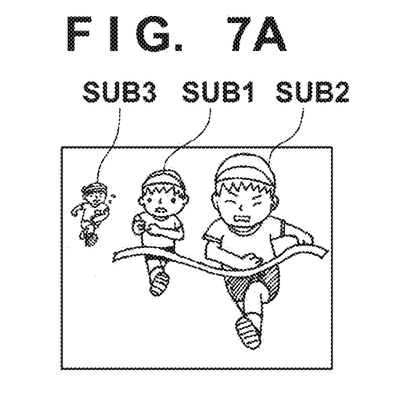
FIGS. 7A to 7F are views showing images for explaining the first and third embodiments.
Figure 7B:
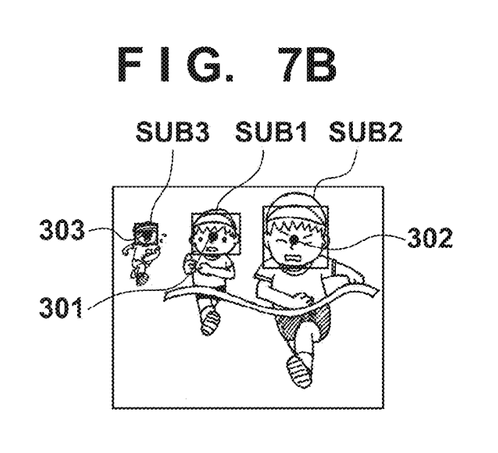
Figure 7C:
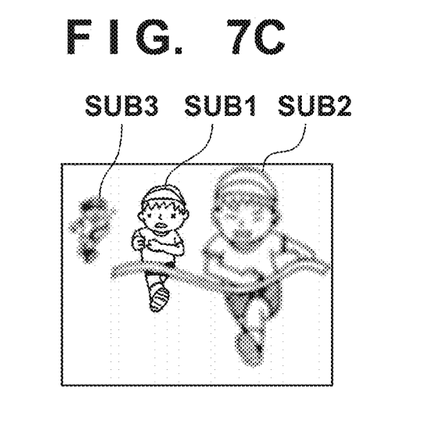
Figure 7D:
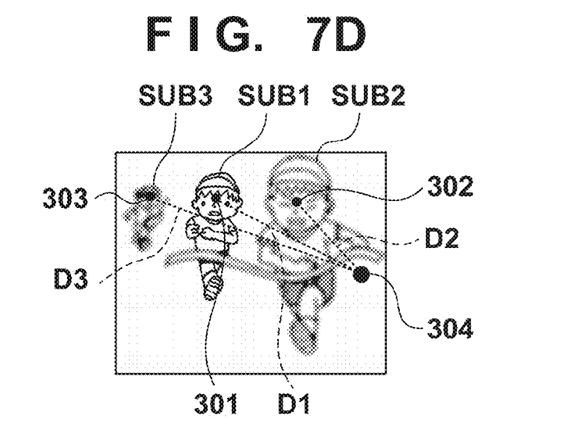
Figure 7E:
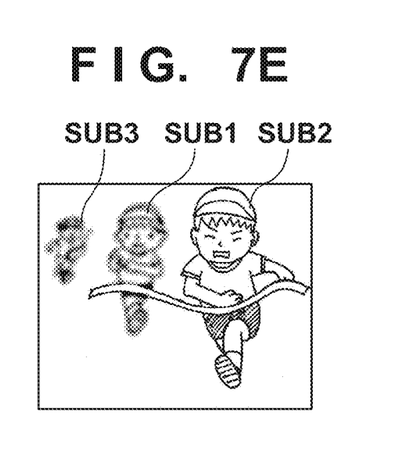
Figure 8:
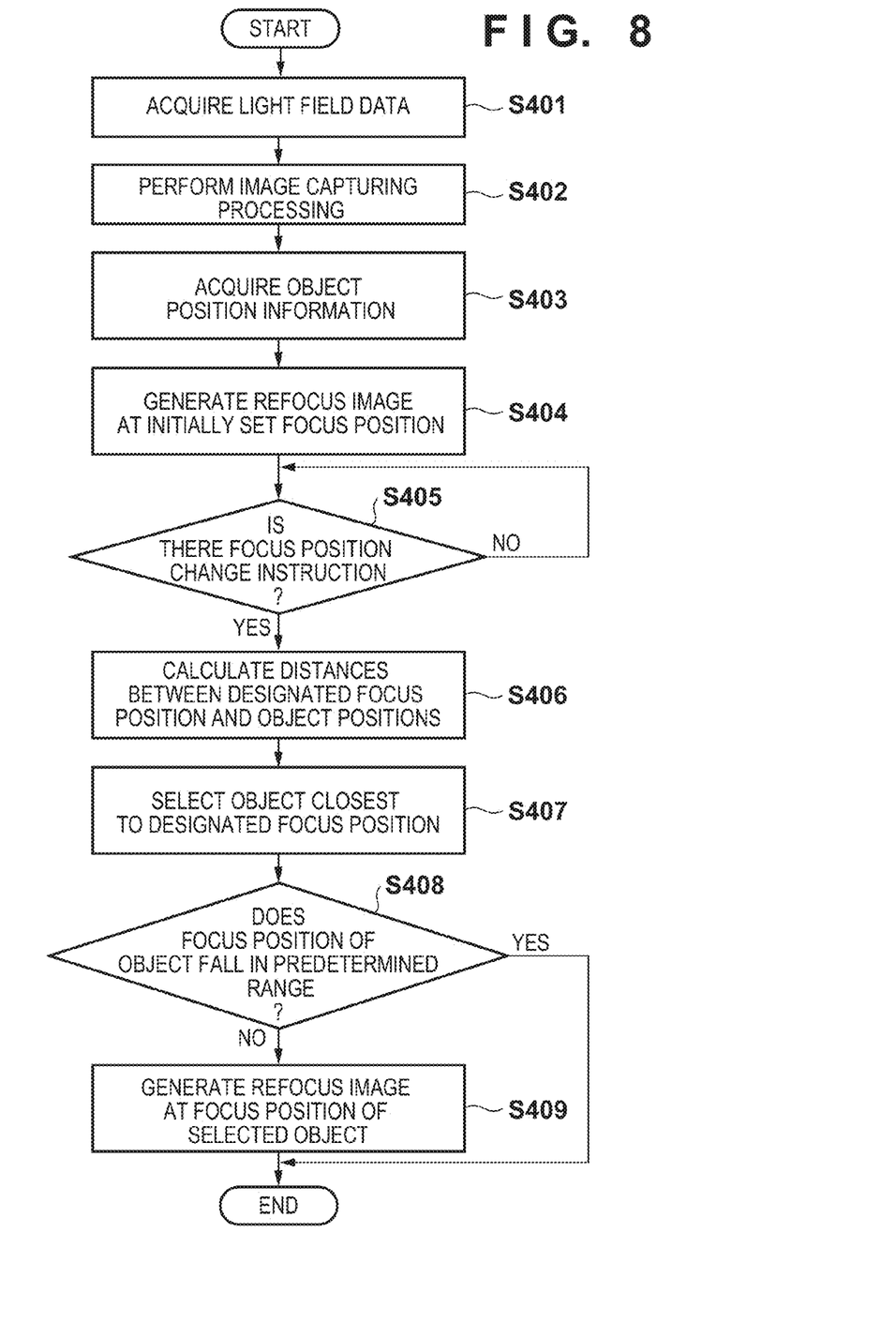
FIG. 8 is a flowchart of the second embodiment in which an object is estimated to determine whether the object falls in a predetermined depth of field from a current focus position, and the focus position is automatically adjusted.

Processes in steps S401 to S407 of FIG. 8 are the same as those in steps S201 to S207 of FIG. 6 according to the first embodiment. In step S408, a refocus image generation unit 124 determines whether a focus position transferred from an object selection unit 123 in step S407 falls in a predetermined depth of field from a currently set focus position. If the transferred focus position does not fall in the predetermined depth of field, the process shifts to step S409; if it falls in the predetermined depth of field, the process ends. The predetermined depth of field can be set in advance by the user. In step S409, the refocus image generation unit 124 reads out digital image data stored in a memory 109, and generates a refocus image by using a refocus coefficient at the focus position transferred from the object selection unit 123 in step S407. The refocus image generation unit 124 then outputs the refocus image to a display unit 110.

With the above-described arrangement, when a plurality of objects fall in a predetermined depth of field, refocus calculation need not be performed sequentially depending on an object selection result. Power consumption can therefore be reduced, compared to the first embodiment.

Third Embodiment

The sequence of an operation of performing refocus calculation processing at a focus position designated by the user, the focus position of an object selected by estimating an object, and a current focus position according to the third embodiment of the present invention will be described below with reference to FIG. 9.

Figure 9:
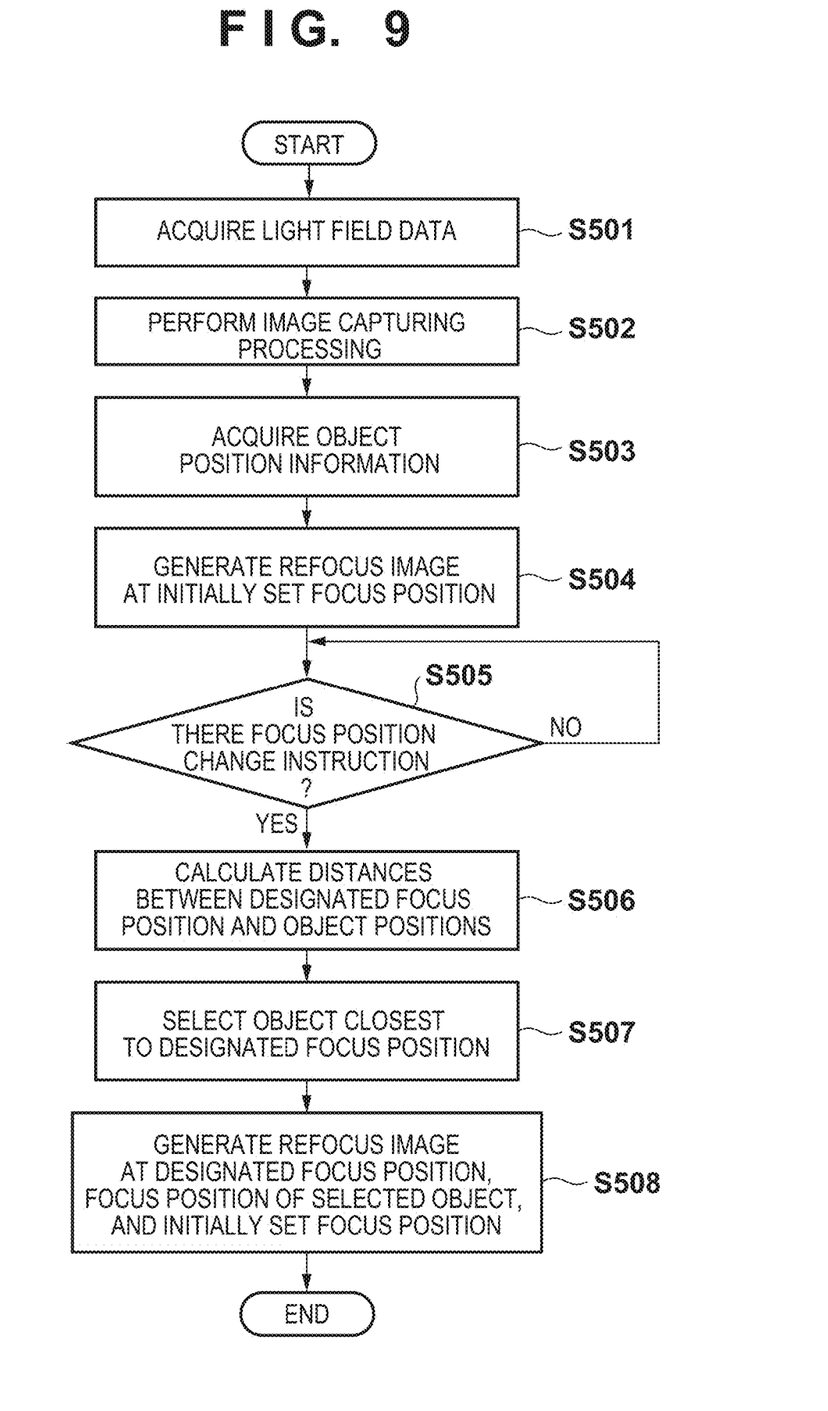
FIG. 9 is a flowchart of the third embodiment in which refocus calculation processing is performed at a focus position designated by the user, the focus position of an object selected by estimating an object, and a current focus position.

Processes in steps S501 to S507 of FIG. 9 are the same as those in steps S201 to S207 of FIG. 6 according to the first embodiment. In step S508, a refocus image generation unit 124 reads out digital image data stored in a memory 109, and generates a refocus image at a predetermined crop angle of view by using a refocus coefficient at a focus position designated in step S505. Further, the refocus image generation unit 124 generates a refocus image at a predetermined crop angle of view by using a refocus coefficient at a focus position transferred from an object selection unit 123 in step S507. The refocus image generation unit 124 combines the two in-refocus images at the crop angles of view to a current image.

Figure 7F:
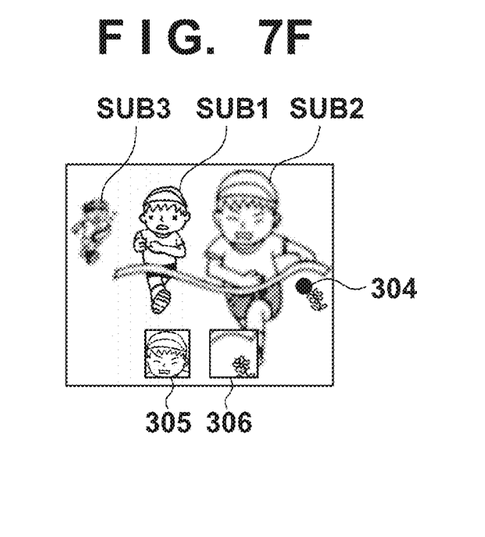

FIG. 7F shows a display image in which cropped images 305 and 306 are combined to an image obtained by refocusing on the object SUB1 in step S504. Reference numeral 304 denotes a focus position to which the user has input a change instruction. The image 306 is cut out at a predetermined crop angle of view centered on the designated focus position 304, and undergoes refocus calculation processing. The image 305 is cut out and cropped at the angle of view of a face frame detected in step S503, and undergoes refocus calculation processing.

With the above-described arrangement, an image in which refocus calculation processing is performed at a plurality of focus positions can be confirmed simultaneously.

Fourth Embodiment

The sequence of an operation of estimating an object and automatically adjusting the focus position when the crop angle of view of an image area designated by the user is increased to display the image area according to the fourth embodiment of the present invention will be described below with reference to FIG. 10.

Figure 10:
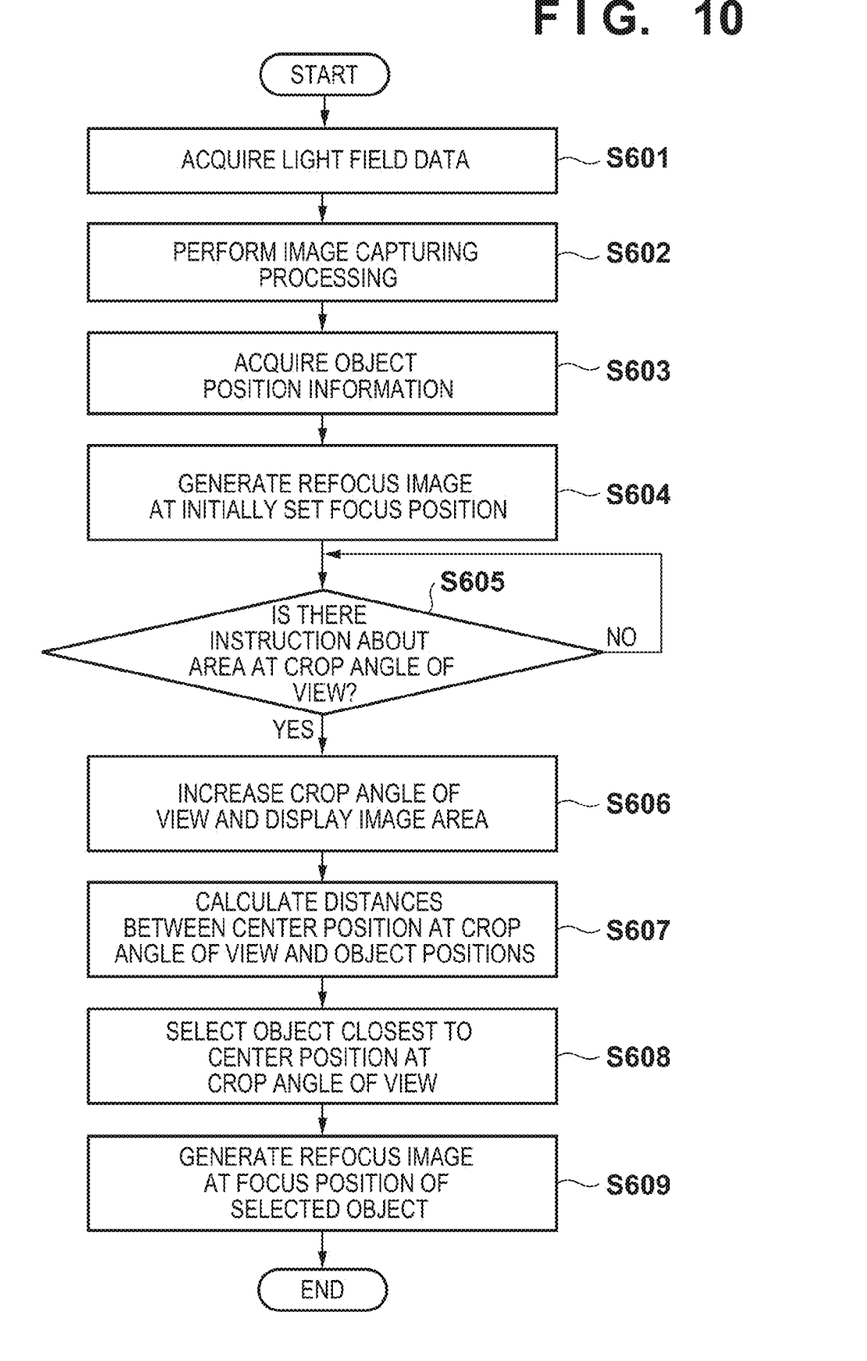
FIG. 10 is a flowchart of the fourth embodiment in which an object is estimated and the focus position is automatically adjusted when the crop angle of view of an image area designated by the user is increased to display the image area.

Processes in steps S601 to S604 of FIG. 10 are the same as those in steps S201 to S204 of FIG. 6 according to the first embodiment. If the user designates, via an operation unit 107, an image area to be cropped, enlarged, and displayed in step S605, the process shifts to step S606; if the user does not designate such an image area, the process returns to step S605.

Figure 11A:
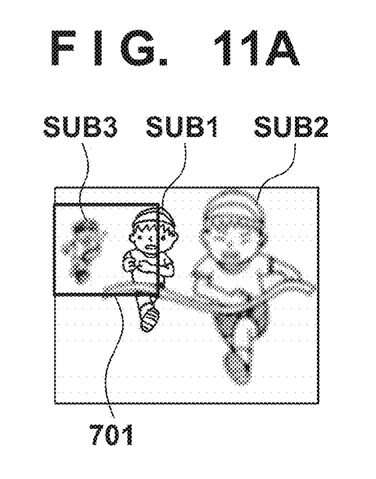
FIGS. 11A to 11D are views showing images for explaining the fourth embodiment.

FIG. 11A shows a display image in which the initially set focus position is an object SUB1 in a shot image of objects SUB1, SUB2, and SUB3. In step S604, the object SUB1 is in refocus, and the images of the objects SUB2 and SUB3 have blurred. Reference numeral 701 denotes an image area the user wants to crop, enlarge, and display.

In step S606, the image area designated in step S605 is cropped, enlarged to a display screen size, and output to a display unit 110.

Figure 11B:
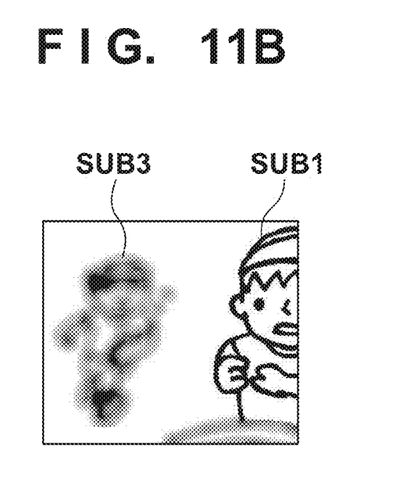

FIG. 11B shows a display image in which the designated image area 701 is cropped and enlarged to a display screen size. Then, in step S607, a distance calculation unit 122 calculates distances between the center position of the image area designated in step S605 and all object positions detected in the cropped image in step S603, and stores the calculation results in a memory 109.

Figure 11C:
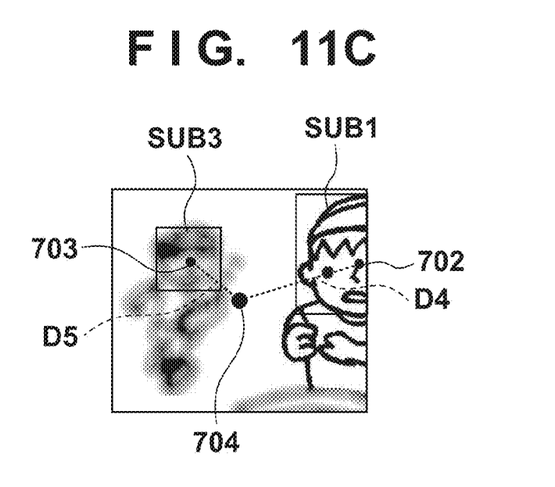

In FIG. 11C, reference numeral 704 denotes a center position of the designated image area; 702, a face position of the object SUB1; and 703, a face position of the object SUB3. D4 is the distance between the face position of the object SUB1 and the center position 704, and D5 is the distance between the face position of the object SUB3 and the center position 704. The distance of an object position is calculated from the center position of a designated image area and the object position. However, an arbitrary position of a designated image area may be used instead of the center position of the designated image area.

In step S608, an object selection unit 123 selects an object having a shortest distance from the center position of the designated image area based on the results of the distances calculated in step S607. The object selection unit 123 then transfers information of the selected object position to a refocus image generation unit 124.

In FIG. 11C, D5<D4, so the object SUB3 is selected and the face position 703 is transferred to the refocus image generation unit 124. In step S609, the refocus image generation unit 124 reads out the digital image data stored in the memory 109, generates a refocus image by using a refocus coefficient at the focus position transferred from the object selection unit 123 in step S608, and outputs it to the display unit 110.

Figure 11D:
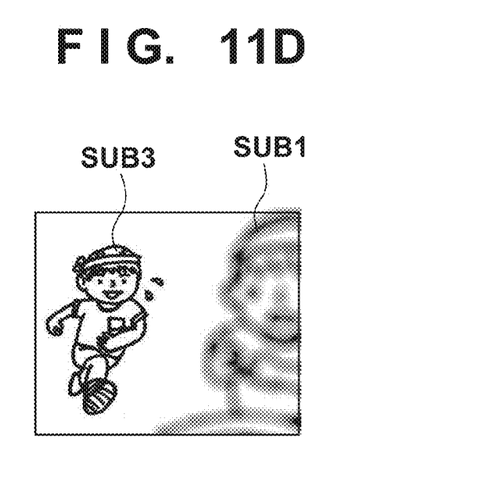

FIG. 11D shows a display image in which a focus position selected after cropping, enlargement, and display is the object SUB3 in the shot image of the objects SUB1, SUB2, and SUB3. In step S609, the object SUB3 is in refocus, and the image of the object SUB1 has blurred. If a selected closest object does not fall in the designated image area, the image area may be moved so that the selected object falls within the image area, and then refocus calculation processing may be performed.

With the above-described arrangement, when refocus calculation processing is performed in a display image obtained by cropping and enlarging an arbitrary image area designated by the user with respect to acquired light field data, refocus calculation processing is performed to the position of an object closest to the center position of the designated image area. Even for an object which is out of focus and has blurred and is hard to confirm, an object of interest can be estimated, and refocus calculation processing can be accurately, easily performed to an object position the user wants.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-018964, filed Feb. 1, 2013 which is hereby incorporated by reference herein in its entirety.

What is claimed is:

1. An image processing apparatus comprising:
a display; and
one or more processors configured to implement the functions of an image data acquisition unit, an information acquisition unit, a generation unit, a designation unit, and a distance calculation unit,
wherein:
the image data acquisition unit is configured to acquire image data, captured by an image capturing device, capable of generating a refocus image in which a focus position is changed by image processing;
the information acquisition unit is configured to acquire information of object distances of objects, wherein object distance is a distance in a direction of depth of field;
a the generation unit is configured to generate a refocus image at a changed focus position by combining, as the image processing, pixels of the acquired image data based on positions of light beams at the changed focus position, wherein each of the light beams corresponds to respective pixels;
the display is configured to display the refocus image;
the designation unit is configured to designate an address in an image displayed by said display; and
the distance calculation unit is configured to calculate distances between the designated address and positions of the objects in the displayed image,
wherein said generation unit generates a refocus image using, as a focus position, an object distance of one of the objects based on the address designated by the designation unit.

2. The apparatus according to claim 1, wherein said generation unit sets the focus position of the refocus image to an object distance of an object corresponding to a shortest distance among the distances calculated by said distance calculation unit.

3. The apparatus according to claim 1, wherein said generation unit includes a determination unit configured to determine whether a focus position determined in accordance with the address designated by said designation unit falls in a range of a predetermined depth of field from a focus position of a preset refocus coefficient, and when the focus position falls in the range of the predetermined depth of field, does not newly generate a refocus image, and wherein the determination unit is implemented by the one or more processors.

4. The apparatus according to claim 1, wherein in a case that the focus position does not fall in the range of the predetermined depth of field, said generation unit generates a refocus image at the focus position determined in accordance with the address designated by said designation unit.

5. The apparatus according to claim 1, wherein said image data acquisition unit acquires the image data from an output from an image sensor in which a plurality of pixels each for receiving a light beam having passed through a partial area of a pupil of an imaging lens are arrayed.

6. The apparatus according to claim 1, further comprising image capturing device configured to capture image data.

7. The apparatus according to claim 1, wherein said image capturing device comprises microlens array and sets of a plurality of photoelectrical conversion units, wherein each set of the plurality of photoelectrical conversion units corresponds to each microlens of said microlens array.

8. The apparatus according to claim 7, wherein said detection unit detects an face image as the specified object.

9. The apparatus according to claim 1, wherein the captured image data is a light-field data.

10. The apparatus according to claim 1, further comprising a detection unit configured to detect a specified object and a position of the specified object in the displayed image, wherein said detection unit is implemented by the one or more processors.

11. The apparatus according to claim 1, further comprising a cropping unit configured to crop a refocus image generated by said generation unit, and
wherein said cropping unit crops a refocus image in response to a designation of an address in the displayed image by said designation unit and said display unit displays the refocus image, and the refocus image is generated at the focus position corresponding to a shortest object distance from among the object distances of objects calculated by said distance calculation unit, and
wherein the cropping unit is implemented by the one or more processors.

12. A method of controlling an image processing apparatus, comprising:
an image data acquisition step of acquiring image data, captured by an image capturing unit, capable of generating a refocus image in which a focus position is changed by image processing;
an information acquisition step of acquiring information of object distances of objects, wherein object distance is a distance in a direction of depth of field;
a generation step of generating a refocus image at a focus position by combining, as the image processing, pixels of the acquired image data based on positions of light beams at the changed focus position, wherein each of the light beams corresponds to respective pixels;
a display step of displaying the refocus image on a display;
a designation step of designating an address in the displayed image displayed in the display step; and
a distance calculation step of calculating distances between the designated address and positions of the objects in the displayed image,
wherein in the generation step, a refocus image using, as a focus position, an object distance of one of the objects based on the address designated by the designation step is generated.

13. A non-transitory computer-readable storage medium storing a program for causing a computer to execute a control method defined in claim 6.

14. An image processing apparatus comprising:
a display; and
one or more processors configured to implement an image data acquisition unit, an information acquisition unit, a generation unit, a designation unit and a distance calculation unit, wherein:
the image data acquisition unit is configured to acquire data by an image capture device having microlens array and sets of a plurality of photoelectrical conversion units, wherein each set of the plurality of photoelectrical conversion units corresponds to each microlens of said microlens array;
the information acquisition unit is configured to acquire information of object distances of objects, wherein object distance is a distance in a direction of depth of field;
the generation unit is configured to generate an image in which a focus position is changed by combining pixels of the acquired data based on positions of light beams at the changed focus position, wherein each of the light beams corresponds to respective pixels;
the display is configured to display the image;
the designation unit is configured to designate an address in the image displayed by said display; and
the distance calculation unit is configured to calculate distances between the designated address and positions of the objects in the image,
wherein said generation unit generates an image using, as a focus position, an object distance of one of the objects based on the address designated by the designation unit.

15. A method of controlling an image processing apparatus, comprising:
an image data acquisition step of acquiring data by an image capture unit having microlens array and sets of a plurality of photoelectrical conversion units, wherein each set of the plurality of photoelectrical conversion units corresponds to each microlens of said microlens array;
an information acquisition step of acquiring information of object distances of objects, wherein object distance is a distance in a direction of depth of field;
a generation step of generating an image in which a focus position is changed by combining pixels of the acquired data based on positions of light beams at the changed focus position, wherein each of the light beams corresponds to respective pixels;
a display step of displaying the image on a display;
a designation step of designating an address in the image displayed in said display step; and
a distance calculation step of calculating distances between the designated address and positions of the objects in the image,
wherein in said generation step, an image is generated using, as a focus position, an object distance of one of the objects based on the address designated in the designation step.

16. A non-transitory computer-readable storage medium storing a program for causing a computer to execute a control method defined in claim 15.

* * * * *